United States Patent [19]

Yoshihiro et al.

[11] Patent Number: 4,758,912
[45] Date of Patent: Jul. 19, 1988

[54] TAPE LOADING APPARATUS

[75] Inventors: Mitsugu Yoshihiro; Takashi Sasao, both of Kanagawa, Japan

[73] Assignee: Sony Corporation, Tokyo, Japan

[21] Appl. No.: 26,376

[22] Filed: Mar. 16, 1987

[30] Foreign Application Priority Data

Apr. 3, 1986 [JP] Japan ................... 61-76918

[51] Int. Cl.⁴ .................. G11B 15/43; G11B 15/665
[52] U.S. Cl. ......................... 360/71; 360/85
[58] Field of Search .................... 360/71, 85

[56] References Cited

U.S. PATENT DOCUMENTS

| | | | |
|---|---|---|---|
| 4,370,682 | 1/1983 | Katoh | 360/71 |
| 4,636,887 | 1/1987 | Kato et al. | 360/71 |
| 4,686,591 | 8/1987 | Kobayashi et al. | 360/85 |

Primary Examiner—Robert S. Tupper
Attorney, Agent, or Firm—Alvin Sinderbrand

[57] ABSTRACT

In a magnetic tape cassette recording and/or reproducing device having a tape loading apparatus for withdrawing tape from an operatively positioned cassette and wrapping the withdrawn tape about a guide drum having a rotary head for recording or reproducing signals on the tape; supply and take-up reel motors apply torques to resist unwinding of the tape from supply and take-up reels in the operatively positioned cassette, a servo-control maintains the supply reel in a stopped condition during a loading operation, the ratio of currents supplied to the supply and take-up reel motors, respectively, for achieving the stopped condition of the supply reel and for applying a constant torque to the take-up reel is determined and the radius of the tape wound on one of the reels is calculated from such ratio, whereupon, a value of the torque that has to be applied to that one reel for maintaining a predetermined tension in the tape during the loading operation is calculated in accordance with the calculated radius of the tape wound on that one reel.

14 Claims, 2 Drawing Sheets

4,758,912

TAPE LOADING APPARATUS

BACKGROUND OF THE INVENTION

1. Field of the Invention

This invention relates generally to magnetic tape cassette recording and/or reproducing devices, such as, VTRs, and more particularly is directed to improvements in the tape loading apparatus thereof by which magnetic tape is withdrawn from an operatively positioned cassette and wrapped about a guide drum having one or more associated rotary heads for recording or reproducing signals on the tape.

2. Description of the Prior Art

In an existing tape loading apparatus, during a loading operation thereof, the supply reel within the operatively positioned cassette is braked so as to be maintained in a stopped condition while the tape is withdrawn from the cassette by unwinding of the tape from the take-up reel. During such withdrawal of the tape from the cassette, a constant torque, which does not vary with changes in the radius of the tape wound on the take-up reel, is applied to the take-up reel in the direction to resist unwinding of the tape therefrom for the purpose of maintaining a tension in the withdrawn tape. When the radius of the tape wound on the take-up reel is large, the inertia of the take-up reel is similarly large. Therefore, when the speed at which the tape is being withdrawn from the cassette in the course of a loading operation is sharply reduced, the large inertia of the take-up reel may override the constant torque resisting unwinding of the tape from the take-up reel with the result that slack develops in the withdrawn tape and, thereafter, such slack is abruptly taken up by the loading apparatus causing a drastic increase in tension and possible damage to the tape.

OBJECTS AND SUMMARY OF THE INVENTION

Accordingly, it is an object of this invention to provide a tape loading apparatus for a magnetic tape cassette recording and/or reproducing device which avoids the development of extreme tape tension conditions during the tape loading operation.

More specifically, it is an object of this invention to provide a tape loading apparatus, as aforesaid, in which the tape is withdrawn by being unwound from the take-up reel of an operatively positioned cassette at precisely controlled speeds which are substantially independent of the radius of the tape then wound on the take-up reel, and hence are independent of the inertia of the take-up reel.

In accordance with an aspect of this invention, in a magnetic tape cassette recording and/or reproducing device including a tape guide drum having at least one rotary head associated therewith for recording and/or reproducing signals on a magnetic tape wrapped around the drum, a cassette holder spaced from the drum for operatively positioning a tape cassette containing supply and take-up reels on which a magnetic tape is wound, and a tape loading apparatus operative in a loading operation to withdraw the take from the operatively positioned cassette and to wrap the withdrawn tape about the drum; a supply reel motor and a take-up reel motor are provided for applying torques resisting rotations of the supply and take-up reels, respectively, in directions for unwinding the tape therefrom, servo-control means controls the supply reel motor so as to maintain the supply reel in a stopped condition during the loading operation, motor control means controls the take-up reel motor so as to apply a constant torque to the take-up reel during the loading operation, means determine a ratio of currents supplied to the supply and take-up reel motors, respectively, for achieving the stopped condition of the supply reel and for applying the constant torque to the take-up reel, means, for example, in the form of a micro- processor or CPU, calculate the radius of the tape wound on one of the reels of the operatively positioned cassette in accordance with the determined ratio of the currents, and further calculate, in accordance with such radius, a value of the torque that has to be applied to that one reel by the associated reel motor for maintaining a predetermined tension in the tape during the loading operation, and means maintain the torque applied to that one reel at the calculated value during the loading operation.

The above, and other objects, features and advantages of the invention, will be apparent from the following detailed description of an illustrative embodiment thereof which is to be read in connection with the accompanying drawings.

DETAILED DESCRIPTION OF PREFERRED EMBODIMENTS

Figure 1:
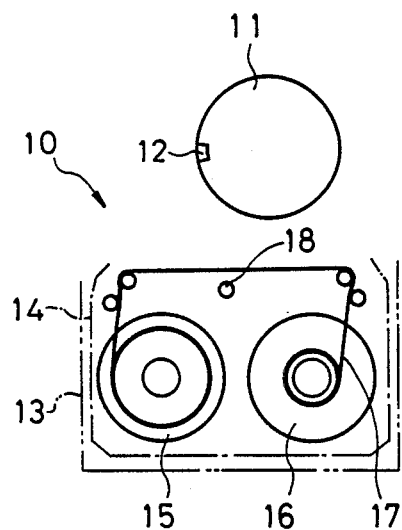
FIG. 1 is a diagrammatic view illustrating essential parts of a magnetic tape cassette recording and/or reproducing device shown prior to a tape loading operation.

Referring to the drawings in detail, and initially to FIG. 1 thereof, it will be seen that a conventional magnetic tape cassette recording and/or reproducing device or VTR 10 generally includes a tape guide drum 11 having at least one rotary head 12 associated therewith for recording or reproducing signals on a magnetic tape when the latter is wrapped around drum 11. The VTR 10 is further shown to include a holder 13 spaced from drum 11 for operatively positioning a tape cassette 14 which contains rotatable supply and take-up reels 15 and 16, respectively, on which a magnetic tape 17 is wound. Finally, the known VTR includes a tape loading apparatus, for example, as disclosed in detail in U.S. Pat. No. 4,527,208 having a common assignee herewith, and of which only a tape withdrawing member 18 appears on FIG. 1. Prior to a tape loading operation, tape withdrawing member 18 extends into the cassette 14 operatively positioned by holder 13 and is positioned in back of a run of the tape 17 extending between reels 15 and 16 (FIG. 1). In the course of a tape loading operation, as shown on FIG. 2, tape withdrawing member 18 is suitably moved out of the operatively positioned cassette 14 in a path that at least partly encircles drum 11 so that member 18 withdraws tape 17 from the cassette and wraps the withdrawn tape at least partly about drum 11.

Figure 3:
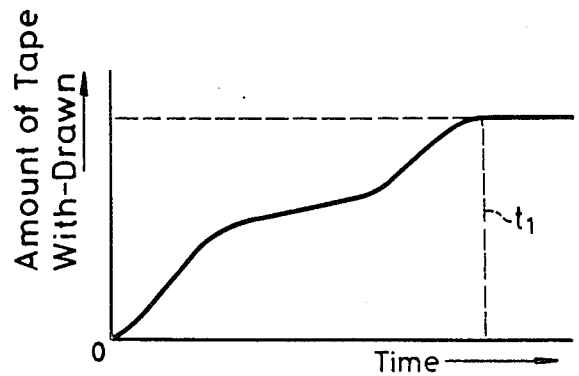
FIG. 3 is a graph showing changes, with time, in the amount of tape withdrawn from the cassette in the course of the tape loading operation of the device shown on FIGS. 1 and 2.

As shown on FIG. 3, the amount of tape withdrawn from the cassette does not increase uniformly from the beginning of a loading operation to the completion thereof at the time $t_1$. Rather, it is desirable that the speed at which the magnetic tape is withdrawn from cassette 14 during a loading operation should be changed with time, as indicated by the solid line on FIG. 4. In other words, there are desirably two surges or increases in the speed of withdrawal of the tape at the beginning and end portions, respectively, of the loading operation.

More particularly, in a loading operation of the known tape loading apparatus, supply reel 15 is braked during the loading operation, and the magnetic tape 17 is withdrawn from cassette 14 by being unwound from take-up reel 16. Conversely, at the completion of a recording or reproducing operation, the tape withdrawing member 18 is returned from the position shown on FIG. 2 to the position shown on FIG. 1 while take-up reel 16 is rotated in the direction for winding the tape thereon so that the previously withdrawn tape is returned to cassette 14 in the course of a tape unloading operation.

During the loading operation, that is, during the withdrawal of the tape by unwinding from the take-up reel 16, a torque is applied to the take-up reel in the direction for resisting such unwinding of the tape therefrom, for example, by means of a take-up reel motor suitably coupled to reel 16. In accordance with the prior art, such torque applied to take-up reel 16 has a constant value irrespective of the radius of the tape wound on the take-up reel. When the radius of the tape wound on the take-up reel is large, that is, when a major portion of the tape is wound on the take-up reel, the inertia of that reel is correspondingly large. Accordingly, when the speed of tape withdrawal is to be sharply reduced for example, as at a on FIG. 4, the large inertia of the take-up reel causes the latter to reduce its unwinding speed at a slower rate than is desired, for example, as indicated in broken lines at a' on FIG. 4, so that the tape tension is reduced below the desired value and slack is formed in the withdrawn tape. Finally, the torque resisting turning of the take-up reel in the direction for unwinding tape therefrom overcomes the large inertia of the reel and the continued movement of the tape withdrawing member 18 causes a sudden or abrupt increase in the tape withdrawing speed, and also in the tape tension, as at $t_o$ on FIG. 4 so that the risk of damage to the tape is considerable.

Figure 2:
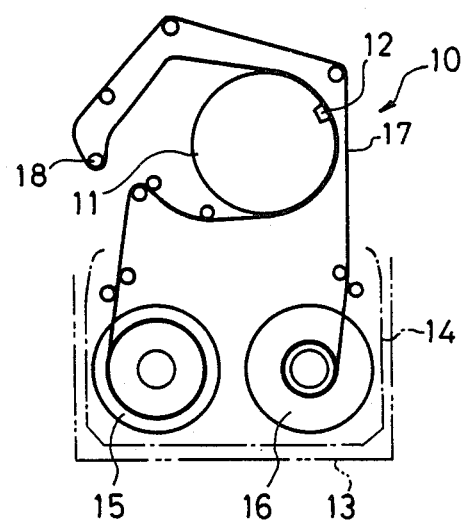
FIG. 2 is a view similar to that of FIG. 1, but showing the device at the completion of a tape loading operation.
Figure 5:
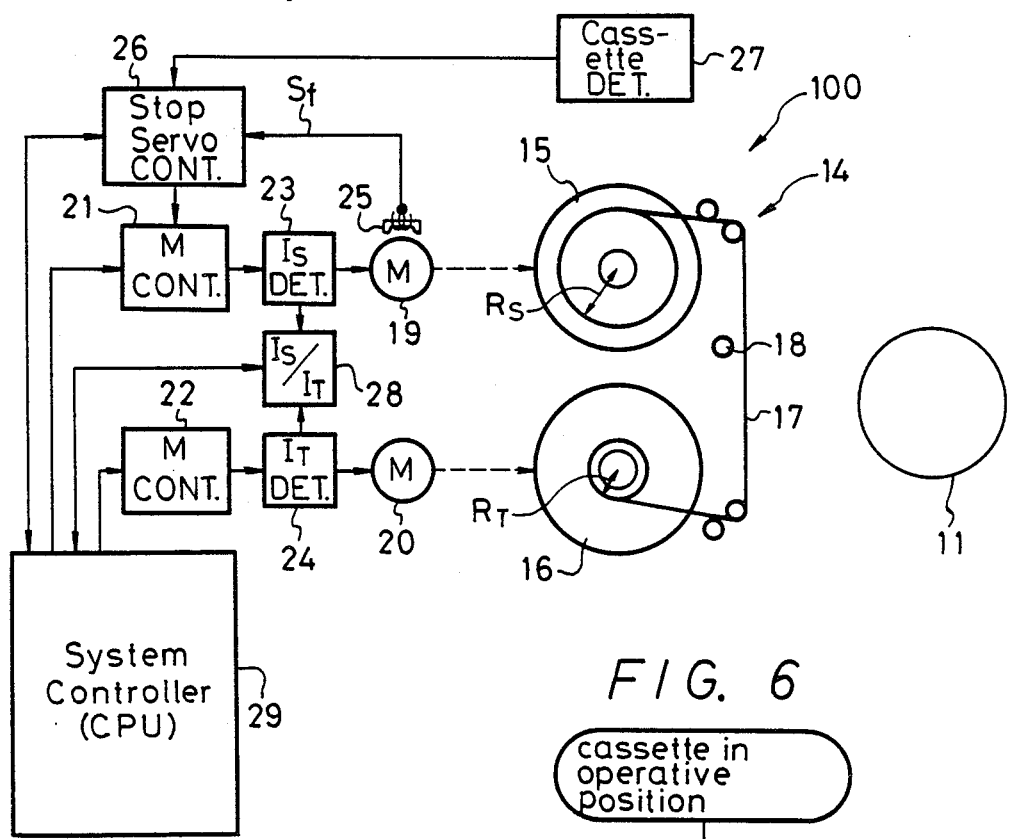
FIG. 5 is a schematic block diagram illustrating an embodiment of the present invention.

Referring now to FIG. 5, it will be seen that, in a magnetic tape cassette recording and/or reproducing device 100 according to this invention which is otherwise similar to the known device 10 previously described with reference to FIGS. 1 and 2, and which has its corresponding elements identified by the same reference numerals, a supply reel motor 19 and a take-up reel motor 20 are suitably coupled with supply reel 15 and take-up reel 16, respectively, of an operatively positioned cassette. Suitable motor control circuits 21 and 22 are provided for controlling the supplying of currents $I_S$ and $I_T$ through current detectors 23 and 24, respectively, to motors 19 and 20. A frequency generator 25 is associated with motor 19 to provide a frequency signal $S_f$ which indicate rotation of motor 19, and hence of supply reel 15. Such frequency signal $S_f$ is applied to a stop servo control circuit 26 which, upon selection of a loading operation, responds to the arrival of tape cassette 14 in the operative position thereof, as determined by a cassette detector 27, to provide a servo-action for motor control circuit 21. In other words, during a loading operation, frequency generator 25 indicates, by its output signal $S_f$, any rotation of supply reel 15 in the direction for unwinding the tape therefrom, and stop servo control circuit 26 responds to such signal $S_f$ to cause supply reel motor 19 under the control of motor control circuit 21 to apply a torque to supply reel 15 which is adequate for preventing such rotation, that is, for establishing a stopped condition of supply reel 15.

The apparatus according to the present invention, as shown schematically on FIG. 5, is completed by a circuit 28 connected with current detectors 23 and 24 for measuring the ratio between the currents $I_S$ and $I_T$ sensed by detectors 23 and 24 as being supplied to supply reel motor 19 and take-up reel motor 20, respectively. An output signal from circuit 28 corresponding to the determined or measured ratio between currents $I_S$ and $I_T$ is applied to a system controller 29, such as, a microcomputer or CPU, which is operative to provide control signals to motor control circuits 21 and 22 for controlling motors 19 and 20 in accordance with the present invention.

Figure 6:
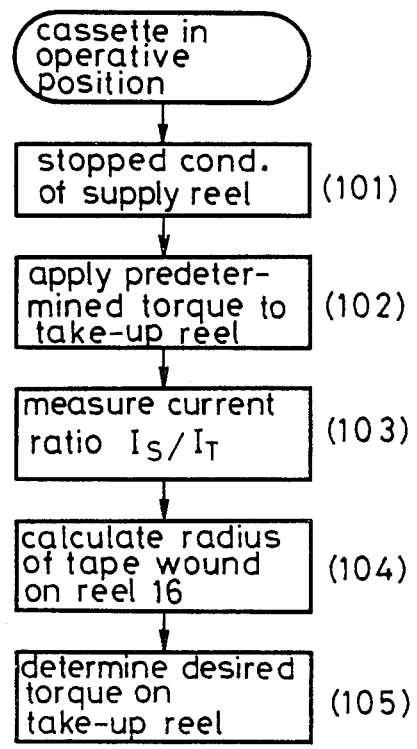
FIG. 6 is a flow chart to which reference will be made in explaining the operation of the embodiment of this invention shown on FIG. 5.

More particularly, when tape cassette 14 is operatively positioned, as determined by detector 27, and a loading operation is called for, for example, at the initiation of a recording or reproducing operation, system controller 29 controls the operations of motors 19 and 20 as described below with reference to the flow chart of FIG. 6:

In step (101), system controller 29 causes stop servo control circuit 26 to respond to signal $S_f$ from frequency generator 25 to cause motor control circuit 21 to provide to motor 19 a current sufficient to prevent movement of supply reel 15. In other words, the current supplied to supply reel motor 19 is sufficient to prevent turning of reel 15 in the direction for unwinding the tape therefrom, with such rotation, if any, being indicated by frequency generator 25.

In the following step (102), system controller 29 provides a control signal to motor control circuit 22 for causing the latter to supply an initial, constant predetermined current $I_T$ to take-up reel motor 20 by which the latter exerts a torque on take-up reel 16 in the direction for winding tape 17 thereon.

Then, in step (103), the current $I_S$ supplied to motor 19 for maintaining the stopped condition of supply reel 15 while the initial constant predetermined torque is applied to take-up reel 16 is determined by detector 23 and circuit 28 measures or determines the ratio $I_S/I_T$ and provides a corresponding signal to system controller 29.

Thereafter, in step (104), the radius $R_T$ of the tape wound on the take-up reel 16 is calculated from the current ratio $I_S/I_T$ as indicated below:

Since the tension in magnetic tape 17 is equal at the portions thereof leading to supply reel 15 and take-up reel 16, respectively, the torques $T_{oT}$ and $T_{oS}$ applied to the take-up reel and the supply reel, respectively, have the following relation:

$$T_{oT}/R_T = T_{oS}/R_S \tag{1}$$

in which $R_S$ and $R_T$ are the radii of the tape wound on the supply and take-up reels 15 and 16, respectively.

Since the torques $To_T$ and $To_S$ are proportional to the currents $I_T$ and $I_S$ applied to the respective motors 20 and 19 for establishing such torques, the following relationship is established from Eq. (1):

$$I_T/I_S = R_T/R_S \quad (2)$$

Also, since the total amount of tape wound on both reels 15 and 16 in the cassette 14 is constant, the following relationship exists:

$$R_T^2 + R_S^2 = A^2 \quad (3)$$

in which A is a constant.

From Eqs (2) and (3), the radius $R_T$ of the tape wound on the take-up reel 16 can be determined as follows:

$$\begin{aligned} R_S &= R_T(I_S/I_T) \\ R_T^2 + [R_T(I_S/I_T)]^2 &= A^2 \\ R_T^2 + R_T^2(I_S/I_T)^2 &= A^2 \\ R_T^2[1 + (I_S/I_T)^2] &= A^2 \end{aligned} \quad (4)$$

$$R_T^2 = \frac{A^2}{1 + (I_S/I_T)^2}$$

$$R_T = \frac{A}{\sqrt{1 + (I_S/I_T)^2}}$$

In the next step (105), system controller 29 uses the calculated value of $R_T$ to determine the torque $To_T$ that has to be applied to the take-up reel 16 by motor 20 during the loading operation for ensuring that a desired tension $T_n$ will be maintained in the tape. Such determination is made in accordance with the below:

$$To_T = T_n \times R_T \quad (5)$$

Figure 4:
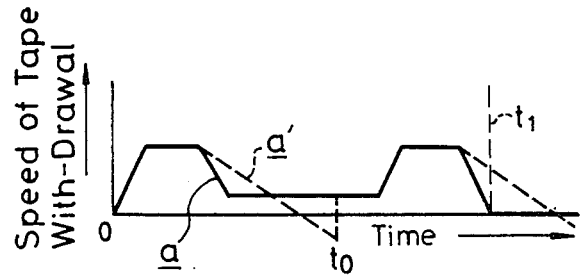
FIG. 4 is a graph showing variations, with time, in the speed of tape withdrawal during the tape loading operation.

It will be appreciated that, having determined the value of the torque $To_T$ to be applied to take-up reel 16 during the loading operation in consideration of the calculated radius $R_T$ of the tape wound on that reel, the system controller 29 suitably signals motor control circuit 22 for ensuring that motor 20 will provide the requisite value of the torque $To_T$ to take-up reel 16. Further, throughout the loading operation, motor 19 is suitably controlled by stop-servo control circuit 26 to prevent turning of supply reel 15 while the magnetic tape is unwound from take-up reel 16 with the desired tension $T_n$ being maintained in the tape. Thus, even when the tape wound on take-up reel 16 has a large radius $R_T$, that is, a major proportion of the total tape is wound on the take-up reel, the relatively large inertia of such reel at the time of the loading operation cannot overwhelm or overpower the resistance to turning of reel 16 in the direction for unwinding the tape therefrom that results from the calculated value of the torque $To_T$. Therefore, the speed at which the magnetic tape is drawn from the take-up reel 16 is substantially ideally varied throughout the loading operation, as indicated by the solid line on FIG. 4. By reason of the foregoing, the generation of slack in the tape followed by the sudden pulling thereof, as at the time $t_o$ on FIG. 4, is avoided in accordance with the present invention. Thus, damage to the tape during the loading operation is avoided.

In cases where the supply reel 15 is mechanically braked during the loading operation, it may be desirable to further apply to the supply reel, by way of supply reel motor 19, a constant torque $To_S$ for resisting turning of the supply reel in the tape unwinding direction, and which has a value determined in accordance with the radius $R_S$ of the tape wound on the supply reel. In that event, system controller 29 is operative to determine the radius $R_S$ of the tape wound on the supply reel from the ratio of the currents $I_T/I_S$ in accordance with the following equation:

$$R_S = \frac{A}{\sqrt{1 + (I_T/I_S)^2}} \quad (6)$$

Then, system controller 29 calculates the torque $To_S$ as below:

$$To_S = T_n \times R_S \quad (7)$$

in which $T_n$ is again the desired value of tape tension.

Of course, during the tape loading operation, system controller 29 signals motor control circuit 21 so that the latter causes motor 19 to apply the calculated torque $To_S$ to supply reel 15 with the result that movement of the latter is prevented during the loading operation even if insufficient mechanical braking is applied thereto.

From the foregoing it will be seen that, in accordance with the invention, the torque applied to one of the reels, for example, the take-up reel, during the loading operation is determined in accordance with the radius of the tape wound on that reel, and hence with reference to the ratio of the amounts of tape on the supply and take-up reels, respectively, with the result that abrupt changes in the speed with which the tape is withdrawn are avoided for preventing excessive tensions and resulting damage to the tape.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope or spirit of the invention as defined in the appended claims.

What is claimed is:

1. In a magnetic tape cassette recording and/or reproducing device including a cylindrical tape guide drum having at least one rotary head associated therewith for recording and/or reproducing signals on a magnetic tape wrapped around the drum, a cassette holder spaced from said drum for operatively positioning a tape cassette containing supply and take-up reels on which a magnetic tape is wound, and a tape loading apparatus operative in a loading operation to withdraw the tape from the operatively positioned cassette and to wrap the withdrawn tape about said drum: the combination of a supply reel motor and a take-up reel motor for applying torques resisting rotations of said supply reel and take-up reel, respectively, of the operatively positioned cassette in directions for unwinding the tape therefrom;

servo-control means for controlling said supply reel motor so as to maintain the supply reel of the operatively positioned cassette in a stopped condition during said loading operation;

motor control means for controlling said take-up reel motor so as to apply a constant torque to said take-up reel of the operatively positioned cassette during said loading operation;

means for determining a ratio of currents supplied to said supply and take-up reel motors, respectively, for achieving said stopped condition of the supply reel and for applying said constant torque to the take-up reel;

means for determining the radius of the tape wound on one of said supply and take-up reels of the operatively positioned cassette in accordance with said ratio of currents, and for calculating, in accordance with the determined radius of the tape wound on said one reel, a value of the torque that has to be applied to said one reel by the associated reel motor for maintaining a predetermined tension in the tape during said loading operation; and means for maintaining the torque applied to said one reel by said associated reel motor at said calculated value thereof during said loading operation.

2. A device according to claim 1; wherein said servo-control means includes frequency generating means for generating a signal in synchronism with rotation of said supply reel motor, and motor control means responsive to a signal provided by said frequency generating means for controlling said supply reel motor.

3. A device according to claim 1; wherein said servo-control means includes means for detecting the presence of a tape cassette in said operative position.

4. A device according to claim 1; wherein said motor control means supplies a constant current to said take-up reel motor so as to achieve said value of the torque applied to said take-up reel.

5. A device according to claim 1; wherein said one reel is said take-up reel, and the radius of the tape wound on said take-up reel of the operatively positioned cassette is calculated by said means for determining in accordance with the following equation:

$$R_T = \frac{A}{\sqrt{1 + (I_S/I_T)^2}}$$

in which $R_T$ is the radius of the wound tape on said take-up reel, $I_S$ and $I_T$ are said currents supplied to said supply and take-up reel motors, respectively, and A is a predetermined constant.

6. A device according to claim 5; wherein said value of the torque to be applied to said take-up reel is calculated in accordance with the following equation:

$$T_{oT} = T_n \times R_T$$

in which $T_{oT}$ is said value of the torque to be applied to said take-up reel, $T_n$ is said predetermined tension in the tape during said loading operation, and $R_T$ is said radius of the wound tape on the take-up reel.

7. A device according to claim 1; wherein said one reel is said take-up reel, and said value of the torque that has to be applied to said take-up reel is calculated in accordance with the following equation:

$$T_{oT} = T_n \times R_T$$

in which $T_{oT}$ is said value of the torque to be applied to said take-up reel, $T_n$ is said predetermined tension to be maintained in the tape during said loading operation, and $R_T$ is the determined radius of the tape wound on said take-up reel.

8. A device according to claim 1; wherein said one reel is said supply reel, and the radius of the tape wound on said take-up reel of the operatively positioned cassette is calculated by said means for determining in accordance with the following equation:

$$R_S = \frac{A}{\sqrt{1 + (I_T/I_S)^2}}$$

in which $R_S$ is the radius of the wound tape on the supply reel, $I_T$ and $I_S$ are said currents supplied to the take-up and supply reel motors, respectively, and A is a predetermined constant.

9. An apparatus according to claim 8; wherein said value of the torque to be applied to said supply reel is calculated in accordance with the following equation:

$$T_{oS} = T_n \times R_S$$

in which $T_{oS}$ is said value of the torque to be applied to said supply reel, $T_n$ is said predetermined tension in the tape during said loading operation, and $R_S$ is said radius of the wound tape on the take-up reel.

10. A method of controlling a magnetic tape cassette recording and/or reproducing device of the type including a cylindrical tape guide drum having at least one rotary head associated therewith for recording and/or reproducing signals on a magnetic tape wrapped around the drum, a cassette holder spaced from the drum for operatively positioning a tape cassette containing supply and take-up reels on which a magnetic tape is wound, a tape loading apparatus operative in a loading operation to withdraw the tape from the operatively positioned cassette and to wrap the withdrawn tape about said drum, and supply and take-up reel motors coupled with the supply and take-up reels, respectively, of an operatively positioned cassette, comprising: the steps of supplying currents to said supply and take-up reel motors for applying torques resisting rotations of said supply and take-up reels, respectively, of the operatively positioned cassette in directions for unwinding the tape therefrom during said loading operation;

servo-controlling said supply reel motor during said loading operation so as to maintain the supply reel of the operatively positioned cassette in a stopped condition;

maintaining constant said torque applied by said take-up reel motor to said take-up reel during said loading operation;

determining a ratio of said currents supplied to said supply and take-up reel motors for achieving said stopped condition of the supply reel and said constant torque applied to said take-up reel;

calculating a radius of the tape wound on one of the supply and take-up reels of the operatively positioned cassette in accordance with said ratio of the currents;

calculating, in accordance with the calculated radius of the tape wound on said one reel, a value of the torque that has to be applied to said one reel by the associated reel motor for maintaining a predetermined tension in the tape; and applying the calculated value of the torque to said one reel during said loading operation.

11. The method according to claim 10; wherein said one reel is the take-up reel, and the radius of the tape wound on said take-up reel of the operatively positioned cassette is calculated in accordance with the following equation:

$$R_T = \frac{A}{\sqrt{1 + (I_S/I_T)^2}}$$

in which $R_T$ is the radius of the wound tape on said take-up reel, $I_S$ and $I_T$ are said currents supplied to said supply and take-up reel motors, respectively, and A is a predetermined constant.

12. The method according to claim 11; wherein said value of the torque to be applied to said take-up reel is calculated in accordance with the following equation:

$$T_{oT} = T_n \times R_T$$

in which $T_{oT}$ is said value of the torque to be applied to said take-up reel, $T_n$ is said predetermined tension in the tape during the loading operation, and $R_T$ is said radius of the wound tape on the take-up reel.

13. The method according to claim 10; wherein said one reel is said supply reel, and the radius of the tape wound on said supply reel of the operatively positioned cassette is calculated in accordance with the following equation:

$$R_S = \frac{A}{\sqrt{1 + (I_T/I_S)^2}}$$

in which $R_S$ is the radius of the wound tape on said supply reel, $I_T$ and $I_S$ are said currents supplied to said take-up and supply reel motors, respectively, and A is a predetermined constant.

14. The method according to claim 13; wherein said value of the torque to be applied to said supply reel is calculated in accordance with the following equation:

$$T_{oS} = T_n \times R_S$$

in which $T_{oS}$ is said value of the torque to be applied to said supply reel, $T_n$ is said predetermined tension in the tape during the loading operation, and $R_S$ is said radius of the tape wound on said supply reel.

* * * * *